US009527366B2

(12) United States Patent
Kantor et al.

(10) Patent No.: US 9,527,366 B2
(45) Date of Patent: Dec. 27, 2016

(54) AIR SPRING ARRANGEMENT WITH INTEGRATED CONTROL VALVE

(71) Applicant: KNORR-BREMSE Systeme fuer Nutzfahrzeuge GmbH, Munich (DE)

(72) Inventors: Kornel Kantor, Kecskemet (HU); Miklos Tanczos, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/663,103

(22) Filed: Mar. 19, 2015

(65) Prior Publication Data
US 2015/0191068 A1 Jul. 9, 2015

Related U.S. Application Data

(63) Continuation of application No. PCT/EP2013/069620, filed on Sep. 20, 2013.

(30) Foreign Application Priority Data

Sep. 21, 2012 (DE) .................. 10 2012 108 941

(51) Int. Cl.
*B60G 17/00* (2006.01)
*B60G 17/048* (2006.01)
(Continued)

(52) U.S. Cl.
CPC ........... *B60G 17/0485* (2013.01); *B60G 11/27* (2013.01); *B60G 17/0525* (2013.01);
(Continued)

(58) Field of Classification Search
CPC .................... B60G 2202/415; B60G 2202/43; B60G 11/27; B60G 17/0525; B60G 17/0565
See application file for complete search history.

(56) References Cited

U.S. PATENT DOCUMENTS 2,844,385 A 7/1958 Pribonic
3,000,624 A * 9/1961 Cislo ............... B60G 17/04
137/627.5
(Continued)

FOREIGN PATENT DOCUMENTS

CN 101417594 A 4/2009
DE 2601665 A1 * 7/1977 ......... B60G 17/0525
(Continued)

OTHER PUBLICATIONS

Voith et al., Air Spring Arrangement With Integrated Control Valve, Sep. 26, 2011, EPO, WO 2011/117125 A1, Machine Translation of Description.*

(Continued)

Primary Examiner — James English
(74) Attorney, Agent, or Firm — Crowell & Moring LLP

(57) ABSTRACT

An air spring arrangement is disclosed. The air spring arrangement has at least one integrated control valve for the admission of compressed air into a pressure chamber formed between an outer tube, a rolling tube, and an air spring bellows that connects the outer tube and rolling tube. The at least one integrated control valve can be actuated, with multiple switching positions, by an integrated mechanical actuator as a function of an air spring stroke for ride-height adjustment. The pressure chamber includes a compression spring between a tube upper part and a tube lower part of the outer tube. A lever which is mechanically connected to the at least one integrated control valve can be actuated by at least one actuation lug, which is arranged on an end surface of the tube lower part, in order to realize a stepped characteristic for an aeration and deaeration of the pressure chamber.

9 Claims, 2 Drawing Sheets

(51) Int. Cl.
*B60G 11/27* (2006.01)
*B60G 17/052* (2006.01)
*B60G 17/056* (2006.01)

(52) U.S. Cl.
CPC .... *B60G 17/0565* (2013.01); *B60G 2202/152* (2013.01); *B60G 2202/415* (2013.01); *B60G 2500/30* (2013.01)

(56) References Cited

U.S. PATENT DOCUMENTS

| | | | | |
|---|---|---|---|---|
| 4,779,512 | A * | 10/1988 | Leonard | B60G 21/0555 137/625.69 |
| 5,161,817 | A * | 11/1992 | Daum | B60G 17/0525 137/625.21 |
| 5,649,692 | A | 7/1997 | Gilsdorf et al. | |
| 6,332,624 | B1 | 12/2001 | Gilsdorf et al. | |
| 7,887,065 | B2 * | 2/2011 | Trudeau | B60G 17/0155 280/5.514 |
| 2001/0008333 | A1 * | 7/2001 | McKenzie | B60G 17/0525 280/124.157 |
| 2003/0137086 | A1 | 7/2003 | Gross et al. | |
| 2004/0201195 | A1 * | 10/2004 | Plath | F15B 13/0406 280/124.16 |
| 2007/0290482 | A1 * | 12/2007 | Schak | B60D 1/58 280/477 |

FOREIGN PATENT DOCUMENTS

| | | |
|---|---|---|
| DE | 44 09 252 A1 | 9/1995 |
| DE | 196 49 316 A1 | 11/1997 |
| DE | 102 00 553 C1 | 7/2003 |
| DE | 10 2009 046 290 B3 | 7/2011 |
| DE | 10 2010 012 346 A1 | 9/2011 |
| EP | 2 550 168 B1 | 1/2013 |
| HU | WO 2011117125 A1 * | 9/2011 ............. B60G 11/27 |
| JP | 11-78877 A | 3/1993 |

OTHER PUBLICATIONS

PCT/EP2013/069620, International Preliminary Report on Patentability (PCT/IB/373) dated Mar. 24, 2015, enclosing English Translation of Written Opinion of the International Searching Authority (PCT/ISA/237) (Six (6) pages).
PCT/EP2013/069620, International Search Report dated Nov. 22, 2013 (Three (3) pages).
German Examination Report dated May 28, 2013 (Four (4) pages).
Chinese Office Action issued in Chinese counterpart application No. 201380056287.3 dated Apr. 5, 2016, with English translation (Eight (8) pages).

* cited by examiner

AIR SPRING ARRANGEMENT WITH INTEGRATED CONTROL VALVE

CROSS REFERENCE TO RELATED APPLICATIONS

This application is a continuation of PCT International Application No. PCT/EP2013/069620, filed Sep. 20, 2013, which claims priority under 35 U.S.C. §119 from German Patent Application No. 10 2012 108 941.8, filed Sep. 21, 2012, the entire disclosures of which are herein expressly incorporated by reference.

BACKGROUND AND SUMMARY OF THE INVENTION

The present invention relates to an air spring arrangement having at least one integrated control valve for the admission of compressed air into a pressure chamber formed between an outer tube, a rolling tube and an air spring bellows which connects the outer tube and rolling tube, where the control valve can be actuated, with multiple switching positions, by integrated mechanical actuation means in a manner dependent on an air spring stroke for ride-height adjustment, where furthermore, the pressure chamber includes a compression spring which is braced at the face sides between a tube upper part of the outer tube and a tube lower part of the outer tube.

The field of use of the invention extends primarily to automotive engineering. In the area of the running gear of utility vehicles, for example, use is made of vibration dampers which include a normally hydraulic damping element and an air spring arrangement which interacts therewith. For an integrated design, the damping element normally has a reservoir tube which is connected to a rolling tube of the air spring, where the rolling tube is connected via an air spring bellows, which acts as a rolling bellows, to a concentric outer tube which is arranged so as to be axially movable relative to the rolling tube. The air spring bellows, the rolling tube and the outer tube delimit a pressure chamber which is charged with air pressure in order to realize the suspension action.

Vibration dampers of this type are fitted for example in the suspension arrangement of a driver's cab on a running gear of a utility vehicle, in order that the driver's cab is substantially isolated from the vibrations introduced into the running gear from the road via the wheel suspension.

DE 44 09 252 has disclosed an air spring arrangement for a utility vehicle, within which air spring arrangement there is arranged a control valve for the supply and discharge of compressed air, which control valve can be actuated, in a manner dependent on the ride height, by mechanical actuation means which are likewise arranged within the air spring arrangement. It is normally the case that, when the air spring falls to a minimum ride height, compressed air is supplied to the pressure chamber of the air spring arrangement in order to restore the suspension characteristics. By contrast, the pressure chamber is deaerated when it is sought to reduce the ride height of the air spring arrangement.

For this purpose, in this prior art, the control valve is composed of two individual valves, one of which is arranged on the outer tube and one of which is arranged on the rolling tube, which is movable relative to the outer tube. The actuation means are composed of a semirigid regulating rod by means of which the two individual valves are actuated alternately such that one individual valve is closed when the other individual valve opens. However, the actuation means appear to be highly cumbersome owing to the extremely large longitudinal extent and the very large number of individual components.

DE 102 00 553 C1 has disclosed a different air spring arrangement in which use is made of a single control valve which realizes not only aeration and deaeration of the internal pressure chamber but also a middle shut-off position. The control valve is actuated by likewise integrated actuation means which engage on one of the two air spring assemblies, outer tube and rolling tube, which are movable relative to one another. In this case, the actuation means have a structural length shorter than the stroke length of the air spring arrangement. A control element is preloaded by a spring against one of the air spring assemblies which are movable relative to one another, where the control element is mounted in floating fashion relative to the air spring assemblies. A second spring whose force direction acts counter to the first spring thus co-determines the position of the control element.

Furthermore, DE 10 2010 012 346 A1 has disclosed an air spring arrangement having at least one integrated control valve for the admission of compressed air into a pressure chamber formed between an outer tube, a rolling tube and an air spring bellows which connects the outer tube and rolling tube. The control valve can be actuated, with multiple switching positions, by likewise integrated mechanical actuation means in a manner dependent on the air spring stroke for ride-height adjustment. The mechanical actuation means comprise a compression spring which is fastened at the face side to the outer tube or rolling tube, the end of which compression spring interacts with an actuation plunger of a control valve arranged opposite on the rolling tube or outer tube respectively.

Furthermore, DE 196 49 316 A1 has disclosed a ride-height control system for vehicles having a lock chamber, having a lock inlet and having a lock outlet for the feed and discharge of fluid. Furthermore, the ride-height control system has spring elements, where a spring piston emerges from a working cylinder and displaces fluid counter to the pressure of a spring gas cushion. The ride-height control system likewise comprises a regulating opening which defines a setpoint ride height, a spring-compression range and a spring-extension range and which is shut off in the spring-compression range. Via a supply line, fluid is fed into the lock chamber in a feed phase and is discharged from the lock chamber in a discharge phase. The attainment of the setpoint ride height is registered and influenced by means of a sensor. As sensors, use may be made in particular of pressure sensors, or else of light barriers or a control tube fastened to the spring piston. Furthermore, the control tube may also be fastened to the working cylinder.

It is therefore an object of the present invention to provide an air spring arrangement whose control valve can be activated in a precise manner by robust and compact mechanical actuation means and realizes a stepped characteristic of the aeration and deaeration of a pressure chamber.

According to the invention, a lever which is mechanically connected to the at least one integrated control valve can be actuated, by at least one actuating lug arranged on a face surface of the tube lower part, in order to realize a stepped characteristic of an aeration and deaeration of the pressure chamber. The at least one actuating lug is preferably arranged centrally on the face surface of the tube lower part. The lever is mounted on a valve housing of the at least one integrated control valve. Both the lever and the at least one actuating lug are produced from a metallic material.

It is particularly preferable if the at least one integrated control valve is in the form of a 3/3 directional valve and aerates, deaerates and shuts off the pressure chamber. By the 3/3 directional valve, the three switching functions can not only be realized in a compact construction but can also be regulated in a precise manner.

The invention encompasses the technical teaching that the at least one actuating lug protrudes partially into the rolling tube in order to actuate the lever. An actuation of the lever leads to an actuation of the at least one integrated control valve, and to the associated functions of aeration, deaeration and shutting-off of the pressure chamber.

In a preferred exemplary embodiment, the at least one actuating lug is connected to the face surface of the tube lower part by way of a non-positively locking or cohesive connection. A screw connection or welded connection is particularly advantageous. The screw connection has the advantage of enabling the at least one actuating lug to be easily exchanged.

In a further preferred exemplary embodiment, the tube lower part and the at least one actuating lug arranged thereon are formed in one piece. The at least one actuating lug can thus be produced directly during the primary forming or deformation of the tube lower part.

It is preferably the case that the lever has a horseshoe shape and is mounted by way of the two distal ends on the valve housing of the at least one integrated control valve. The horseshoe shape is mounted on the valve housing at two locations, resulting in high stability and strength.

In a further exemplary embodiment, the lever has the shape of a bar and is mounted by way of one distal end on the valve housing of the at least one integrated control valve. This design of the lever yields a weight optimization owing to the material saving, where the reduction of the dynamic mass yields further advantages. Such advantages may include smaller spring elements and a more precise response behavior of the at least one integrated control valve.

It is furthermore provided that, between a full spring-extension position and a partial spring-extension position of at least +15 mm, the at least one actuating lug is not in contact with the lever and the at least one integrated control valve deaerates the pressure chamber, where a deaeration cross section decreases with progressive spring-compression travel.

The invention encompasses the technical teaching that the at least one integrated control valve imparts a shutting-off action in a spring-compression travel range between +3 mm and −3 mm.

It is furthermore preferably the case that aeration of the pressure chamber by the at least one integrated control valve requires a spring-compression travel of less than −3 mm, where an aeration cross section increases with progressive spring-compression travel.

Other objects, advantages and novel features of the present invention will become apparent from the following detailed description of one or more preferred embodiments when considered in conjunction with the accompanying drawings.

Further measures which improve the invention will be presented in more detail below together with the description of a preferred exemplary embodiment of the invention on the basis of the figures.

DETAILED DESCRIPTION OF THE DRAWINGS

Figure 1:
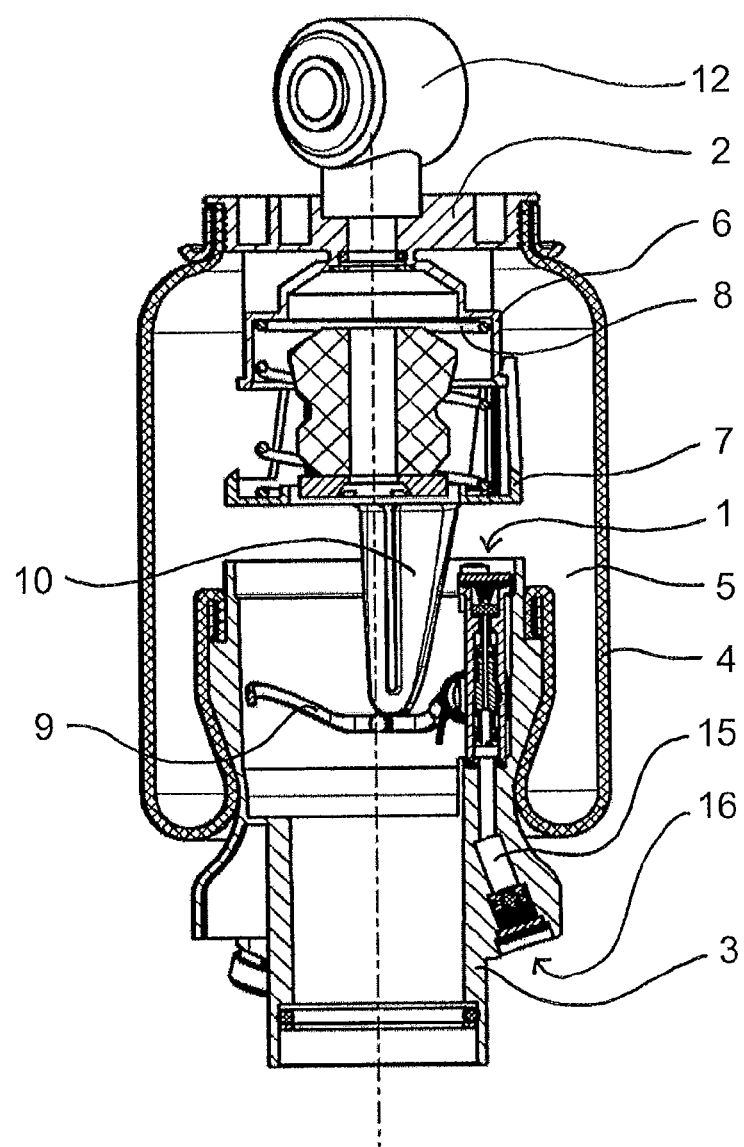
FIG. 1 is a partial longitudinal section through an air spring arrangement according to the invention having an actuating lug and having a horseshoe-shaped lever assigned to the actuating lug and mounted on a control valve.

The air spring arrangement as per FIG. 1 is composed substantially of an outer tube 2 with an upper fastening eyelet 12, opposite which there is situated a rolling tube 3 with an associated lower fastening eyelet (not illustrated here). The lower fastening eyelet is a constituent part of a hydraulic shock-absorbing damper (not illustrated here) which is coaxially surrounded by the outer tube 2 and the rolling tube 3. Running between the outer tube 2 and the rolling tube 3 there is an air spring bellows 4 composed of an elastomer material, which air spring bellows rolls on the outer surface of the rolling tube 3 in a manner dependent on the air spring stroke. The outer tube 2, the rolling tube 3 and the air spring bellows 4 form a pressure chamber 5 which, charged with compressed air, performs the air spring function of the air spring arrangement. For the admission of pressure into the pressure chamber 5, a control valve 1 is provided which is arranged on an inner circumferential surface of the rolling tube 3 and which is in the form of a 3/3 directional valve and which has aeration, deaeration and shut-off switching positions.

Furthermore, a tube upper part 6 integrally formed coaxially on the outer tube 2 forms a telescopic arrangement together with a tube lower part 7 and a compression spring 8 which is arranged and preloaded between the tube upper part and tube lower part. The control valve 1 is actuated, in a manner dependent on the air spring stroke, by a lever 9 which is assigned to the control valve 1 and which is mounted on a valve housing 11 of the control valve 1, and by an actuating lug 10 which is assigned to the lever 9 and which is arranged on a face surface of the tube lower part 7. The preload effected by the compression spring 8 is configured so as to be of such an intensity that the lever 9 is actuated when the actuating lug 10 comes into contact therewith.

The length of the actuating lug 10 and its position relative to the lever 9 is configured such that five phases of valve actuation are realized. Between a full spring-extension travel of approximately +40 mm—in relation to the nominal length of the air spring—and a partial spring-extension travel of approximately +15 mm, the actuating lug 10 is not in contact with the lever 9, such that the lever 9 remains in an upper position and the control valve 1 connects the pressure chamber 5 to a deaeration duct 13. In phase 1, therefore, a deaeration cross section is fully open and has a maximum cross section. As soon as the spring-compression travel falls below a value of +15 mm and the actuating lug 10 actuates the lever 9, phase 2 is initiated. The deaeration cross section decreases in stepless fashion, where the control valve 1 switches from deaerating the pressure chamber 5 to shutting off the pressure chamber 5.

In a spring-compression travel range between +3 mm and −3 mm, the control valve 1 is in phase 3 and is closed. If the spring-compression travel falls below a value of approximately −3 mm, phase 4 begins, where the lever 9, pushed by the actuating lug 10 further downward, opens the control valve 1 and connects an aeration duct 14 to the pressure chamber 5. With progressive spring-compression travel, the aeration cross section increases in size, where a maximum spring-compression travel of approximately −15 mm opens the control valve 1 fully and furthermore has the effect that the tube lower part 7 abuts against the rolling tube 3. The actuating lug 10 can be pushed in no further, and the aeration cross section is open to a maximum extent (phase 5).

Figure 2:
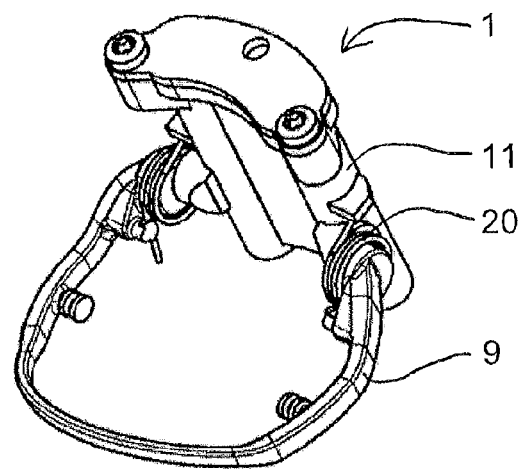
FIG. 2 is an enlarged perspective illustration of the control valve with the horseshoe-shaped lever from FIG. 1 mounted thereon.

As per FIG. 2, the lever 9 is mounted on the valve housing 11 of the control valve 1 at two locations. This design is particularly advantageous from a strength aspect and exhibits high stability. Furthermore, the lever 9 and the control valve 1 constitute a preassembled unit.

Figure 3:
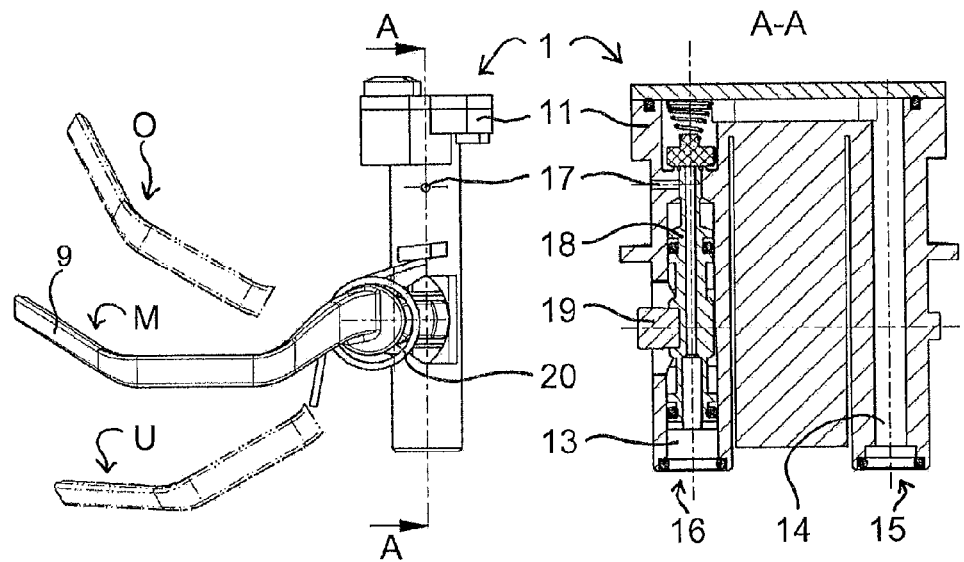
FIG. 3 is a perspective illustration of a further embodiment of the control valve with a bar shaped lever mounted thereon, and the associated sectional view of the control valve.

FIG. 3 shows a further embodiment of the lever 9 mounted on the valve housing 11 of the control valve 1. The lever 9 is of bar-shaped form and has a slightly curved shape. Furthermore, the lever 9 is mounted on the valve housing 11 of the control valve 1 only on one side, and is preloaded by a torsion spring 20 such that, when not subjected to load by the actuating lug 10, the lever 9 is situated in an upper position O. In this position, the control valve 1 has a maximum deaeration cross section. By contrast, when the lever 9 is in a lower position U, the control valve 1 has a maximum aeration cross section. The middle position M of the lever 9, as shown here, shuts off the aeration and deaeration of the pressure chamber 5.

The figure alongside illustrates a section along a section line A-A. It can be seen from the sectional illustration of the control valve 1 that the valve housing 11 has an aeration port 15 and a deaeration port 16 which are connected to aeration and deaeration ducts (not illustrated here) in the rolling tube 3 and thus to aeration and deaeration ports of the air spring unit. Furthermore, a connecting bore 17 is formed in the valve housing 11 for the purpose of producing a fluidic connection between the control valve 1 and the pressure chamber 5. Furthermore, an aeration duct 14 and a deaeration duct 13 are formed in the valve housing 11. The control valve 1 is in the form of a 3/3 directional valve, and the valve plunger 18 is integrated in the deaeration duct 13. Furthermore, the valve plunger 18 is mechanically connected to the lever 9 via a lever journal 19 and is movable upward and downward axially in the deaeration duct 13.

The invention is not restricted to the preferred exemplary embodiments described above. Rather, modifications to these are also conceivable which are also encompassed by the scope of protection of the following claims. For example, it is also possible, instead of a torsion spring 20, for a tension or compression spring to be preloaded such that the lever 9 is situated in the upper position O when not subjected to load by the actuating lug 10. Furthermore, other embodiments of the lever such as, for example, circular or elliptical embodiments, are also possible.

LIST OF REFERENCE SIGNS

1 Control valve
2 Outer tube
3 Rolling tube
4 Air spring bellows
5 Pressure chamber
6 Tube upper part
7 Tube lower part
8 Compression spring
9 Lever
10 Actuating lug
11 Valve housing
12 Upper fastening eyelet
13 Deaeration duct
14 Aeration duct
15 Aeration port
16 Deaeration port
17 Connecting bore
18 Valve plunger
19 Lever journal
20 Torsion spring
M Middle position
O Upper position
U Lower position The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air spring arrangement, comprising:
   an integrated control valve for admission of compressed air into a pressure chamber formed between an outer tube, a rolling tube, and an air spring bellows which connects the outer tube and the rolling tube;
   wherein the pressure chamber includes a compression spring which is braced between a tube upper part of the outer tube and a tube lower part of the outer tube;
   a lever, wherein the lever is mechanically connected to the integrated control valve and wherein the integrated control valve is actuatable, with a plurality of switching positions, by the lever dependent on an air spring stroke for ride-height adjustment, and wherein the lever extends transversely to a main axis of the air spring arrangement; and
   an actuating lug disposed on a face surface of the tube lower part, wherein the lever is actuatable by the actuating lug to realize a stepped characteristic of an aeration and/or deaeration of the pressure chamber by the integrated control valve and wherein the actuating lug protrudes partially into the rolling tube.

2. The air spring arrangement as claimed in claim 1, wherein the actuating lug is connected to the face surface of the tube lower part by a non-positively locking or cohesive connection.

3. The air spring arrangement as claimed in claim 1, wherein the tube lower part and the actuating lug are formed in one piece.

4. The air spring arrangement as claimed in claim 1, wherein the lever has a horseshoe shape and is mounted by two distal ends of the lever on a valve housing of the integrated control valve.

5. The air spring arrangement as claimed in claim 1, wherein the lever has a shape of a bar and is mounted by a distal end of the lever on a valve housing of the integrated control valve.

6. The air spring arrangement as claimed in claim 1, wherein the integrated control valve is in a form of a 3/3 directional valve and aerates, deaerates, and shuts off the pressure chamber.

7. The air spring arrangement as claimed in claim 1, wherein, between a full spring-extension position and a partial spring-extension position of at least approximately +15 mm, the actuating lug is not in contact with the lever and the integrated control valve deaerates the pressure chamber and wherein a deaeration cross section decreases with progressive spring-compression travel from approximately +15 mm to approximately +3 mm.

8. The air spring arrangement as claimed in claim 1, wherein the integrated control valve imparts a shutting-off action in a spring-compression travel range between approximately +3 mm and approximately −3 mm.

9. The air spring arrangement as claimed in claim 1, wherein aeration of the pressure chamber by the integrated control valve requires a spring-compression travel of less than approximately −3 mm and wherein an aeration cross section increases with progressive spring-compression travel as far as approximately −15 mm.

* * * * *